(12) United States Patent
Deák

(10) Patent No.: US 11,175,799 B1
(45) Date of Patent: Nov. 16, 2021

(54) INSPIRATIONAL QUOTE GENERATION, CATEGORIZATION, AND PRESENTATION SYSTEM

(71) Applicant: SOUL SPEAK LLC, San Diego, CA (US)

(72) Inventor: Anita Deák, San Diego, CA (US)

(73) Assignee: SOUL SPEAK LLC, San Diego, CA (US)

( * ) Notice: Subject to any disclaimer, the term of this patent is extended or adjusted under 35 U.S.C. 154(b) by 0 days.

(21) Appl. No.: 17/315,221

(22) Filed: May 7, 2021

(51) Int. Cl.
| | |
|---|---|
| G06F 3/0482 | (2013.01) |
| G06F 16/93 | (2019.01) |
| G06F 3/0485 | (2013.01) |
| G06T 11/60 | (2006.01) |
| G06F 40/166 | (2020.01) |

(52) U.S. Cl.
CPC .......... G06F 3/0482 (2013.01); G06F 3/0485 (2013.01); G06F 16/93 (2019.01); G06F 40/166 (2020.01); G06T 11/60 (2013.01); G06T 2200/24 (2013.01)

(58) Field of Classification Search
CPC .................................................. G06F 3/0482
USPC ......................................................... 715/202
See application file for complete search history.

(56) References Cited

U.S. PATENT DOCUMENTS

| | | | | |
|---|---|---|---|---|
| 5,513,117 A | * | 4/1996 | Small | B42D 15/045 700/233 |
| 5,737,729 A | * | 4/1998 | Denman | G07B 17/00193 700/231 |
| 6,108,640 A | * | 8/2000 | Slotznick | G06Q 30/06 705/7.18 |
| 6,453,300 B2 | * | 9/2002 | Simpson | G06Q 20/203 700/237 |
| 7,097,108 B2 | * | 8/2006 | Zellner | G06K 19/06206 235/492 |
| 7,130,817 B2 | * | 10/2006 | Karas | G06Q 10/101 705/26.8 |
| 7,266,533 B2 | * | 9/2007 | Karas | G06Q 20/02 705/26.35 |
| 7,921,167 B2 | * | 4/2011 | Shroff | G06Q 50/01 709/206 |
| 8,196,038 B2 | * | 6/2012 | Berger | G06Q 10/107 715/243 |
| 8,234,181 B2 | * | 7/2012 | Berger | G06Q 30/0621 705/26.5 |

(Continued)

OTHER PUBLICATIONS

Pinterest.com, "Believe & Succeed Motivational Poster", retrieved from https://www.pinterest.com/pin/243124079858354777/ on Mar. 31, 2021 (3 pages).

*Primary Examiner* — Reza Nabi
(74) *Attorney, Agent, or Firm* — Arc IP Law, PC; Joseph J. Mayo

(57) ABSTRACT

An application such as a phone app that presents and categorizes inspirational cards that may include quotes and images. Cards may be organized into themes, such as "Seek", "Scream", "Speak", "Strong". Cards associated with each theme may be installed with the application. Users may generate their own cards by entering text and selecting or taking a photo. Users may bookmark certain cards as favorites. A "Today" category may present a random selection of a few cards, which users can shuffle and reselect as desired. Users may browse cards using a scrollable set of thumbnails, and they may share cards with other users using messaging services or social media services.

1 Claim, 8 Drawing Sheets

(56) References Cited

U.S. PATENT DOCUMENTS

| | | | | |
|---|---|---|---|---|
| 8,886,740 B2* | 11/2014 | Barman | H04L 51/08 709/206 |
| 9,654,598 B1* | 5/2017 | Crawford | H04W 4/023 |
| 9,654,627 B1* | 5/2017 | Stec | H04W 4/14 |
| 9,881,330 B2* | 1/2018 | Berger | G06Q 50/32 |
| 10,057,205 B2* | 8/2018 | Spicer | H04L 51/32 |
| 10,387,539 B2* | 8/2019 | Scapa | H04L 67/10 |
| 2004/0165218 A1* | 8/2004 | Fredlund | H04N 1/3871 358/1.18 |
| 2004/0254859 A1* | 12/2004 | Aslanian, Jr. | G06Q 30/0641 705/14.73 |
| 2007/0063031 A1* | 3/2007 | Silverbrook | B41J 13/0063 235/432 |
| 2007/0094328 A1* | 4/2007 | Birch | G06Q 10/10 709/204 |
| 2007/0238082 A1* | 10/2007 | Ingrassia | G09B 23/285 434/307 A |
| 2010/0262491 A1* | 10/2010 | Siciliano | G06Q 30/0253 705/14.51 |
| 2012/0227077 A1* | 9/2012 | Spivack | G06F 16/9535 725/110 |
| 2013/0080866 A1* | 3/2013 | Ogilvie | G06F 40/174 715/202 |
| 2014/0229322 A1* | 8/2014 | Ranganath | G06Q 30/0631 705/26.7 |
| 2014/0229552 A1* | 8/2014 | Ranganath | G06Q 50/01 709/206 |
| 2015/0120491 A1* | 4/2015 | Bisht | G06Q 30/0621 705/26.5 |
| 2015/0154676 A1* | 6/2015 | Matousek | G06F 40/103 705/26.5 |
| 2016/0055160 A1* | 2/2016 | Himel | G06F 16/248 707/728 |
| 2016/0163079 A1* | 6/2016 | Lee | G06Q 30/0621 345/689 |
| 2016/0210466 A1* | 7/2016 | Ortiz | G06F 21/10 |
| 2018/0096415 A1* | 4/2018 | Garris | G06Q 30/0641 |
| 2019/0171338 A1* | 6/2019 | Voss | H04L 51/10 |
| 2020/0342442 A1* | 10/2020 | Curtis | G06Q 30/0623 |
| 2021/0233134 A1* | 7/2021 | Marin | G06K 19/06037 |

* cited by examiner

INSPIRATIONAL QUOTE GENERATION, CATEGORIZATION, AND PRESENTATION SYSTEM

BACKGROUND OF THE INVENTION

Field of the Invention

One or more embodiments of the invention are related to the fields of data processing systems and communication systems. More particularly, but not by way of limitation, one or more embodiments of the invention enable an inspirational quote generation, categorization, and presentation system configured to enable users to quickly and conveniently access cards that contain pictures and quotes and generate cards that contain pictures and quotes that are related to multiple categories, for example including, but not limited to, "seek", "scream", "speak" and "strong". Embodiments accept an input from a user and present one or more cards associated with categories to a user.

Description of the Related Art

Current solutions for inspirational quotes include purchasing a poster with a quote on it, generally with a visually appealing image. These solutions are limited in that only one person can buy a particular inspirational poster, that is then hung on a wall and cannot be shared with other users in their time of need.

Posters are also limited because they are static; the only way a person can see different messages or images is to replace the poster or to have multiple posters. Posters also cannot be categorized or customized.

For at least the limitations described above there is a need for an inspirational quote generation, categorization, and presentation system.

BRIEF SUMMARY OF THE INVENTION

One or more embodiments described in the specification are related to an inspirational quote generation, categorization, and presentation system. Embodiments of the invention may store and organize "cards" that include an inspirational quote and a picture; the application may support capabilities such as viewing cards by theme, adding new cards, browsing cards, and sharing cards.

One or more embodiments of the invention may include an application that accepts input from a user, and that executes on a computing device that includes a processor, a memory, a screen, a camera, and a network interface. The application may store several cards in the memory, each of which has one or more images and text. Cards may be organized into categories; a card may be associated with multiple categories. The categories may include themed categories such as "seek", "scream", "speak", and "strong". They may also include a "today" category that contains cards that are randomly selected each day, a "favorites" category, and a "user-generated" category. When the user selects a category, the application may display the cards of that category on the screen. Users may add a selected card to the "favorites" category. The application may present a new card creation interface to the user that has an image selection interface and a text editor. The user may select an image from images stored in the memory, or capture a new image using the device's camera. Newly created cards may be added to the "user-generated" category. Cards may be selected for sharing; shared cards may be transmitted via the device's network interface to a sharing service selected from multiple sharing service options.

In one or more embodiments, the application may accept a shuffle command from the user, and may replace the cards in the "today" category with newly randomly selected cards when the user shuffles.

In one or more embodiments, the application may accept a browse command from the user, and in response may display on the screen a scrollable tile of thumbnails for the cards associated with the themed categories. When the user selects a thumbnail, the card associated with the thumbnail may be displayed.

In one or more embodiments, the application may allow the user to select a card in the "favorites" category and to remove that card from the favorites.

In one or more embodiments, each card may be associated with either exactly one themed category or with the user-generated category.

In one or more embodiments, each themed category may be associated with ten or more cards.

In one or more embodiments, sharing service options for sharing of cards may include one or more of a text message service, an email service, a social media service.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

The above and other aspects, features and advantages of the invention will be more apparent from the following more particular description thereof, presented in conjunction with the following drawings wherein.

DETAILED DESCRIPTION OF THE INVENTION

An inspirational quote generation, categorization, and presentation system will now be described. In the following exemplary description numerous specific details are set forth in order to provide a more thorough understanding of embodiments of the invention. It will be apparent, however, to an artisan of ordinary skill that the present invention may be practiced without incorporating all aspects of the specific details described herein. In other instances, specific features, quantities, or measurements well known to those of ordinary skill in the art have not been described in detail so as not to obscure the invention. Readers should note that although examples of the invention are set forth herein, the claims, and the full scope of any equivalents, are what define the metes and bounds of the invention.

Figure 1:
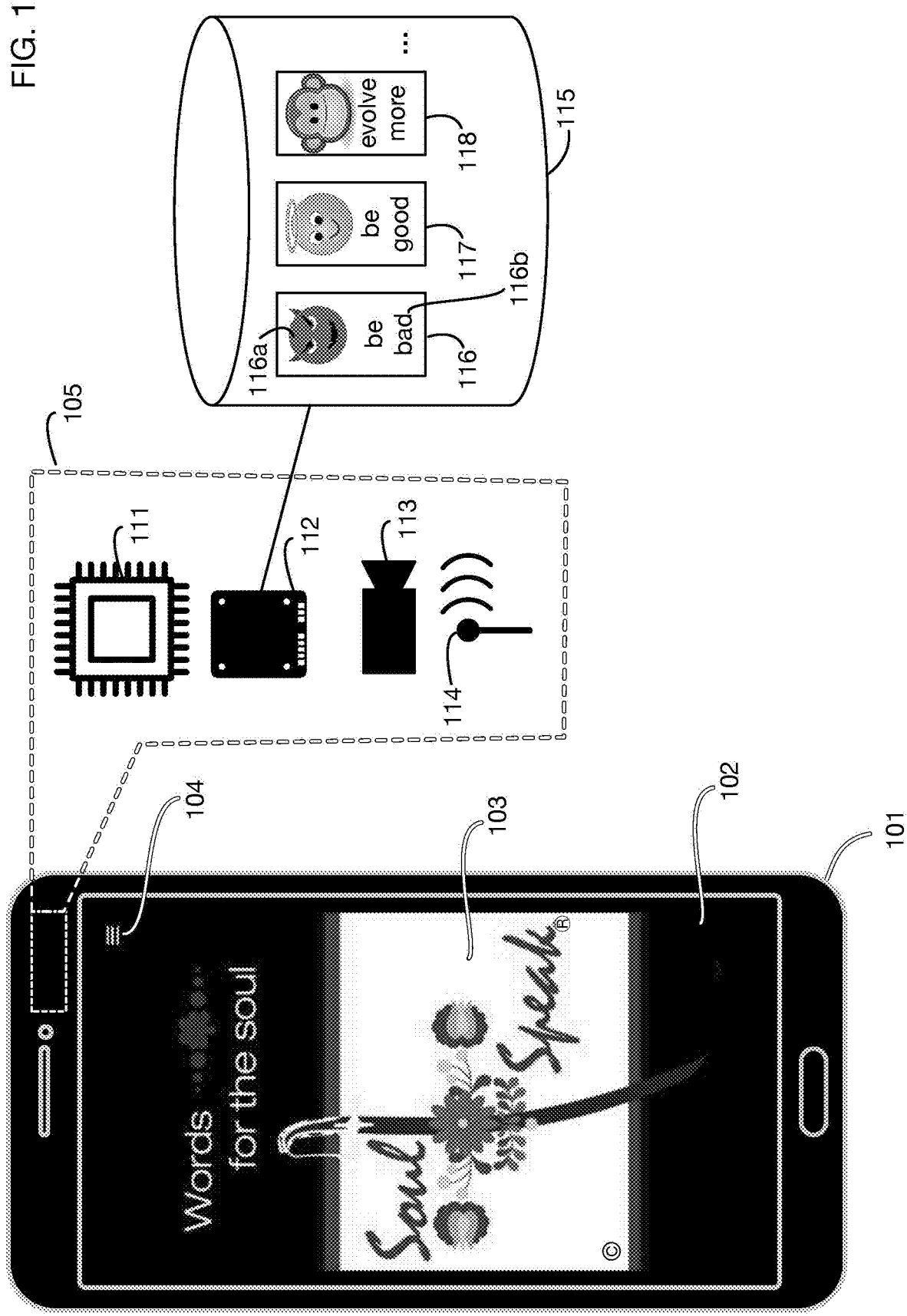
FIG. 1 illustrates hardware, software, and data components of an embodiment of an inspirational quote generation, categorization, and presentation system, which in this embodiment is an app that executes on a mobile phone.

FIG. 1 shows an illustrative embodiment of the invention that includes an app 103 that may execute on a mobile device such as mobile phone 101. One or more embodiments of the invention may be a software application configured to run on any type of hardware, including for example, without limitation, a mobile phone, a tablet, a smartphone, a smart watch, smart glasses, a headset, a home automation hub, a television, a computer, a laptop computer, a notebook computer, a tablet, a PDA, a server computer, or a network of any of these devices. The hardware on which the application executes may contain for example components 105 such as a processor 111, a memory device 112, a camera 113, and a network interface 114. The hardware may have a screen 102, which may be a touchscreen where the user can input gestures, selections, text, or drawings. In one or more embodiments the hardware may include any other user input devices such as a keyboard or microphone. Memory device 112 may be for example an SD card or any other type of volatile or non-volatile memory; some or all of the memory 112 used by the application may be remote from the device 101, on cloud-based servers for example. Memory 112 may contain a database or similar data structure 115 that contains inspirational cards, such as illustrative cards 116, 117, and 118. Database 115 may contain any number of cards. Any number of cards may be pre-loaded into database 115 when the application is installed or updated. Each card may have an image (or multiple images) and text; for example, card 116 has image 116a and text 116b. In one or more embodiments, cards may have any other associated media, such as audio or video for example. Application 103 may have a main menu that for example may appear when a user presses on icon 104; illustrative options in the application menu are described below.

Figure 2:
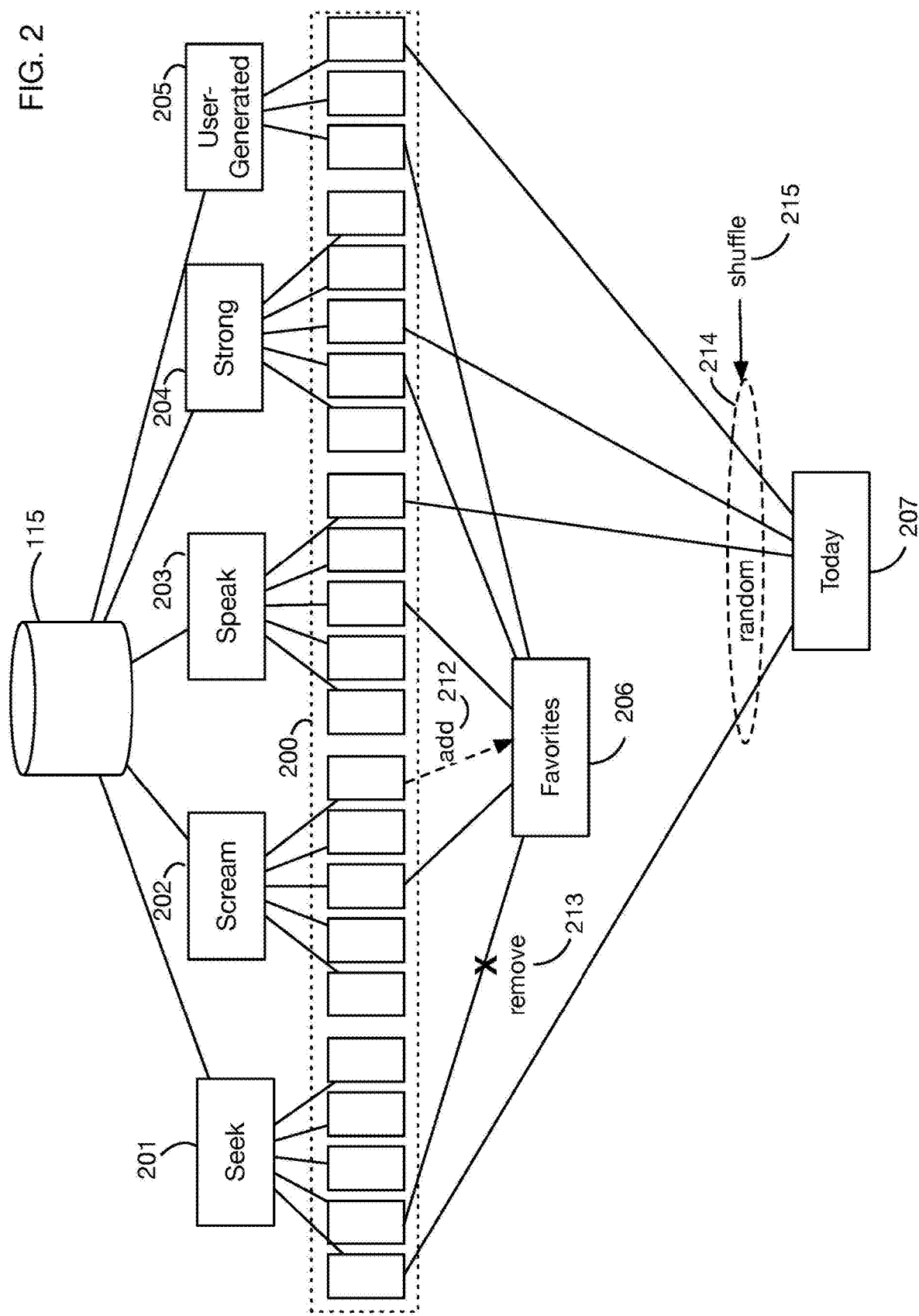
FIG. 2 shows an illustrative organization structure for the inspirational cards managed by an embodiment of the invention.

In one or more embodiments, the inspirational cards may be organized in categories. Each card may be associated with any number of categories. FIG. 2 shows an illustrative organization structure for cards 200 contained in database 115. In this embodiment, the categories include four "themed" categories 201, 202, 203, and 204. One or more embodiments may have any number of themed categories. The specific themes associated with categories 201 through 204 in this embodiment are called "Seek", "Scream", "Speak", and "Strong". These theme names are illustrative; one or more embodiments may have different names for similar themes, or may have additional, fewer, or different themes. In one or more embodiments, cards in each themed category may be pre-installed; for example, each theme may be associated with at least ten cards. Category 205 contains user-generated cards (described below). The user-generated category may have any associated name; for example, in the screenshots shown below this category is named "Universal".

The specific themes "Seek", "Scream", "Speak", and "Strong" organize the overall meanings of each card within the associated category. Most quotes are generic, such as "it will be OK" or "pick yourself up and keep going." These quotes provide little long-term assistance to the user. The theme-based categories provide a structure so that users can see quotes and images that are related to their specific needs. For example, the "Seek" category is associated with an idea such as "Searching through change, is this all I am, all is there? I am calling, is anyone listening." An illustrative card in the seek category has the text "Sometimes the biggest mountain God has to move is the one you've built up in your own heart." The associated image is a massive mountain, but there are steps going nowhere, on the side a chair, and a path that dead-ends. This card is relevant to a person who is in a "Seek" frame of mind. The other themes focus on other questions or states of mind that may be relevant to the user in other situations.

In the illustrative embodiment shown in FIG. 2, each card is associated with exactly one of the themed categories 201 through 204, or with none of the themed categories and with the user-generated category 205. This method of partitioning cards among these categories 201 through 205 is illustrative; one or more embodiments may organize cards in any desired manner.

FIG. 2 also illustrates two additional categories 206 ("Favorites) and 207 ("Today"). These categories each contain subsets of cards 200. The favorites category 206 is a group that a user can add any card to (from any of the categories 201 through 205) with input 212, or remove any card from with input 213. The favorites category functions like a bookmarking feature to provide easy access to cards that the user wants to tag. Users can add any number of cards to the favorites category. In one or more embodiments this category may be given any name (such as "Favorites", "Bookmarks", "Quick Access", "Tagged Cards", and the like).

The "Today" category 207 contains cards chosen with a random selection 214 from the cards 200. This random selection may change on a regular schedule, such as daily. In one or more embodiments the selection may be performed by stratified sampling from specific categories. For example, two cards may be selected randomly from themed categories 201, 203, and 204, and a third card may be selected randomly from the user-generated category 205; if user-generated category 205 is empty, then three cards may be selected randomly from themed categories 201, 203, and 204. (In one or more embodiments, category 202, "Scream", may not be included in the "Today" selection because for example it may be reserved for situations when the user feels down or overwhelmed.) This selection rule is illustrative; one or more embodiments may select any number of cards for the "Today" category 207 using any desired rules. A user may be able to trigger re-selection of a new random set of cards by entering a "shuffle" command 215.

Figure 3:
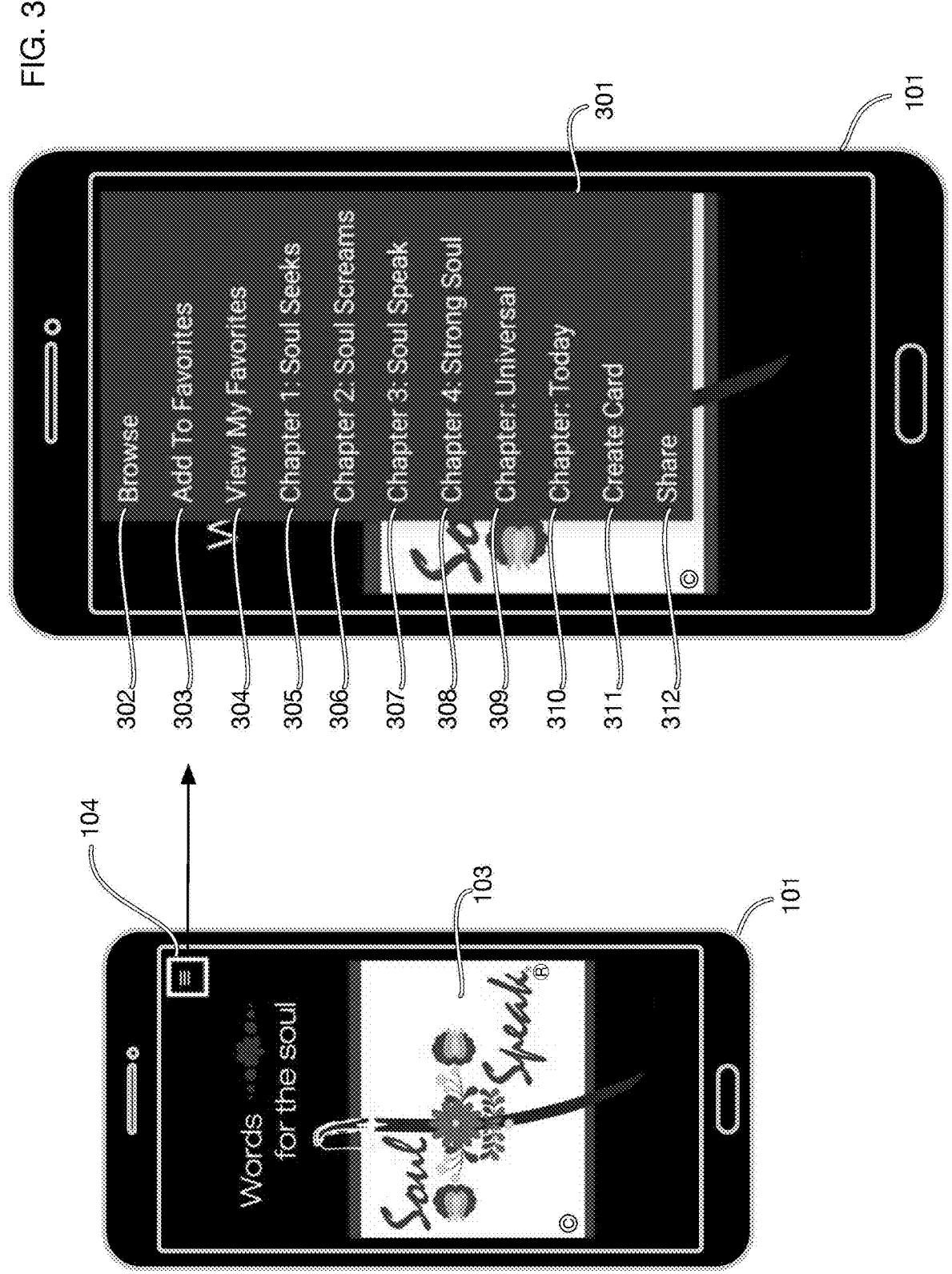
FIG. 3 shows illustrative main menu options for the app of FIG. 1.

FIGS. 3 through 7 show illustrative screenshots of an embodiment of app 103 that executes on a mobile device 101. FIG. 3 shows a main menu 301 that may be shown when a user presses icon 104. Categories are called "Chapters" in this embodiment. Menu option 302 provides a method for a user to browse all of the cards. Options 304 and 303 allow a user to view or manage the Favorites category. Options 305 through 308 show the associated themed categories, and option 309 shows the user-generated ("Universal") category. Option 310 shows the randomly selected "Today" category. Option 311 allows a user to create a new card, and option 312 allows a user to share a card with others.

Figure 4:
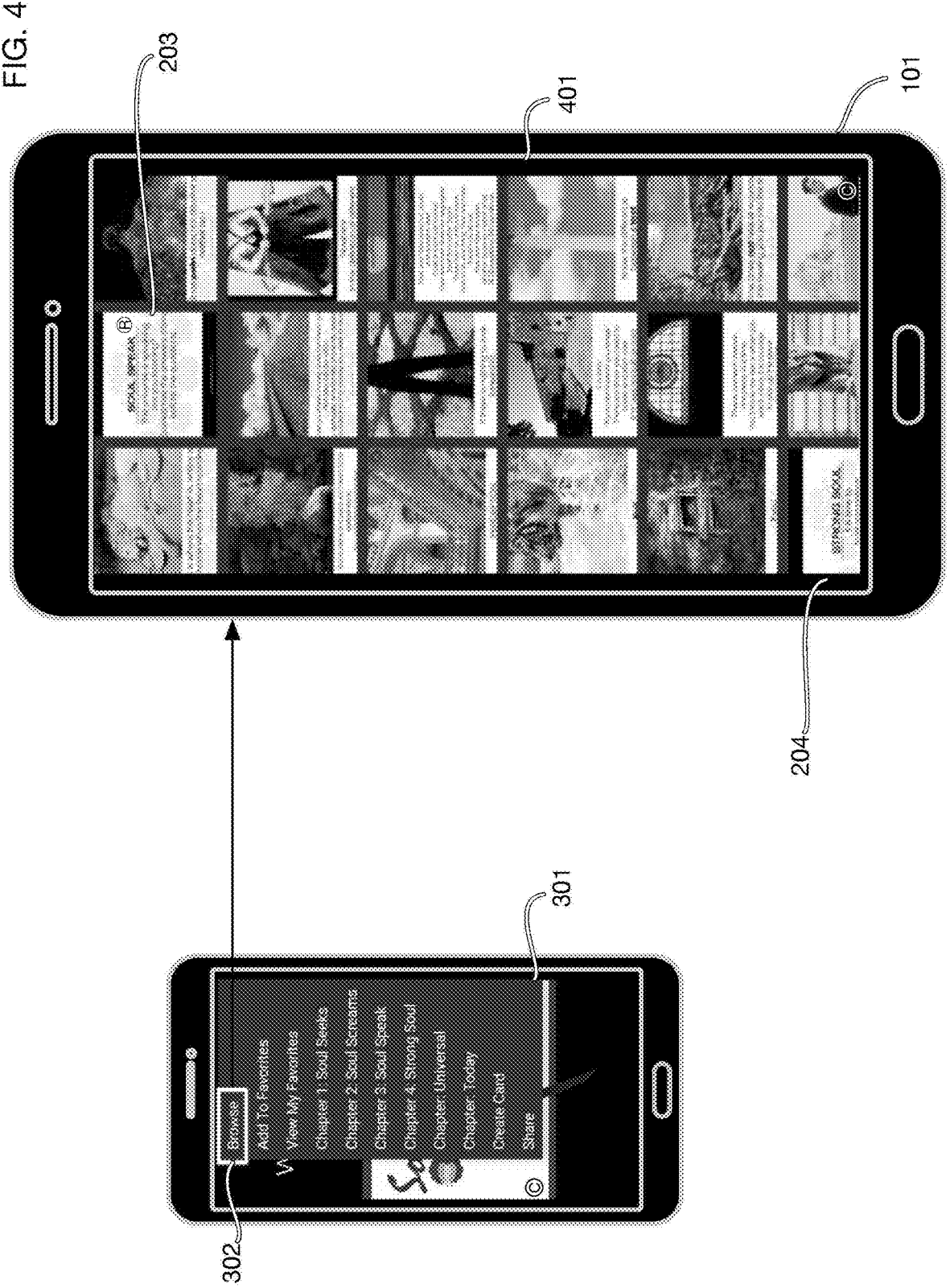
FIG. 4 shows a scrollable tiled gallery view of inspirational card thumbnails that may be shown when the user selects the "Browse" action from the main menu.

FIG. 4 illustrates a screen 401 that may be shown when the user selects Browse option 302. This screen allows users to scroll through the cards in the themed categories. Categories 203 ("Speak") and 204 ("Strong") are visible in the figure. Cards are shown with thumbnail images (and text) so that users can easily find a card by searching for the associated image. If the user selects a thumbnail, a larger sized view of the corresponding card may be shown.

Figure 5:
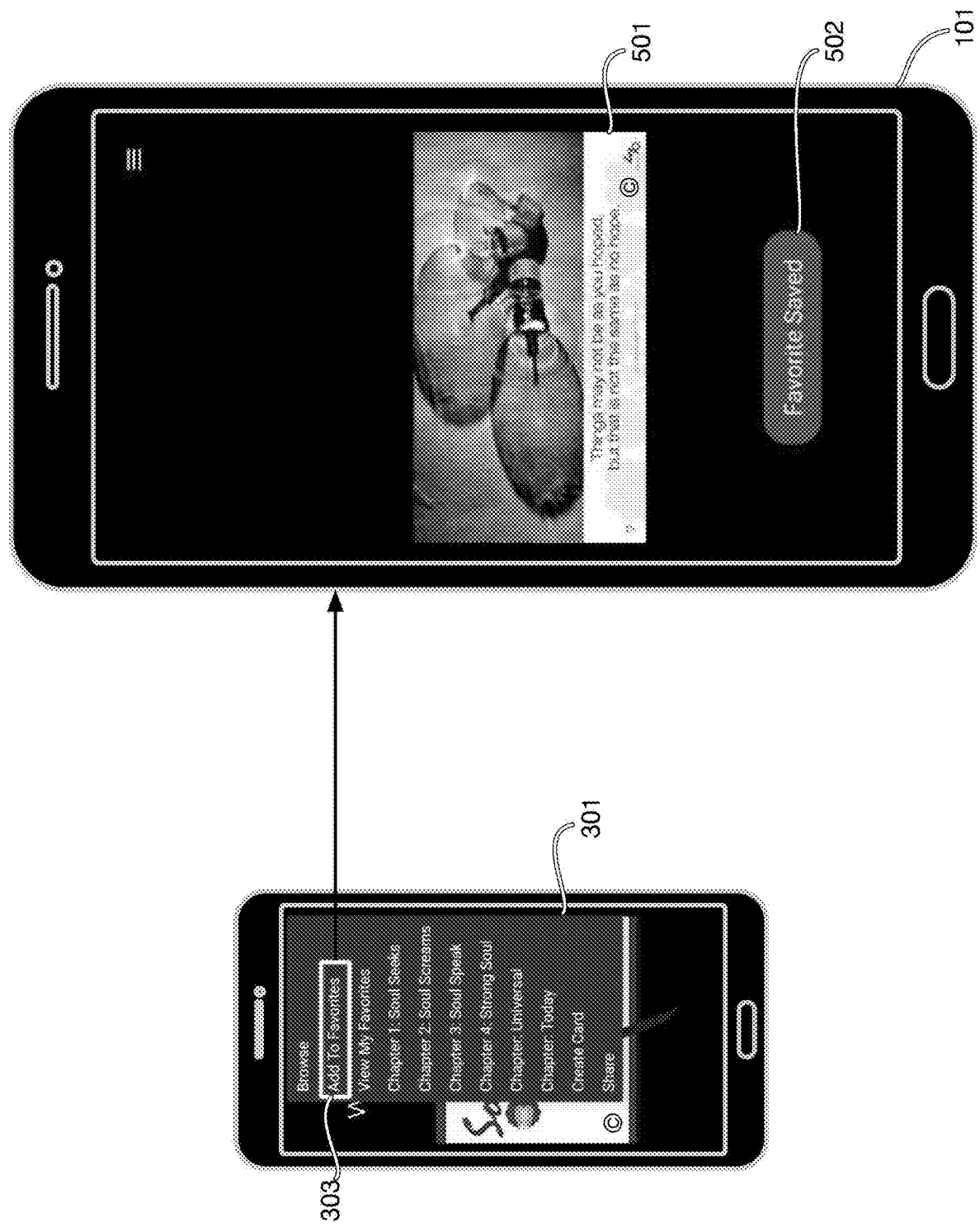
FIG. 5 illustrates the ability of a user to bookmark a card by adding it to the Favorites category.

FIG. 5 shows a user selecting the Add To Favorites option 303 for a card 501; the app responds with message 502 showing that the card has been added. When browsing the Favorites category or viewing a card that is in this category, the user can also remove a card from the Favorites category.

Figure 6:
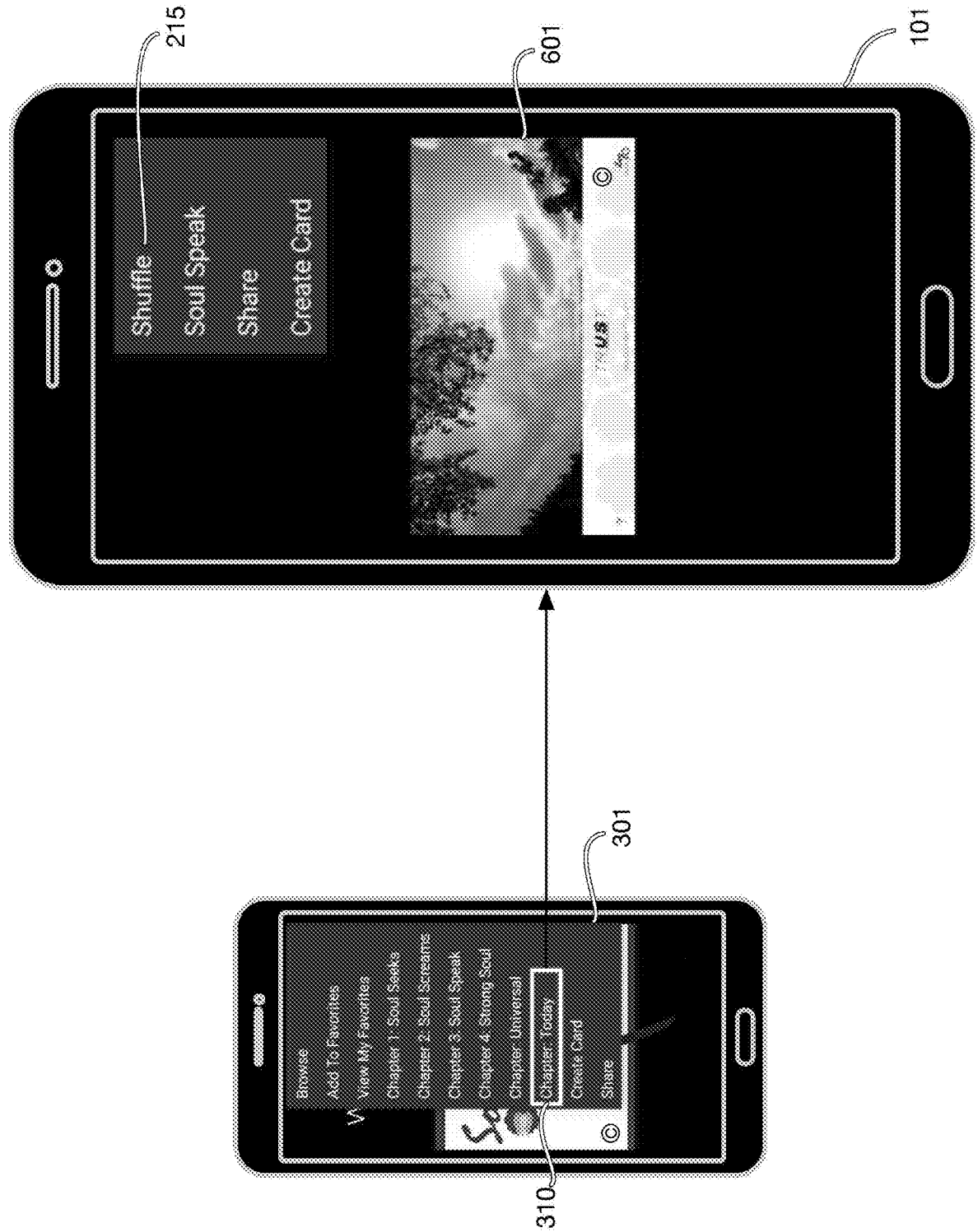
FIG. 6 illustrates a randomly selected "Today" category, which the user can reshuffle to select a new random set of cards.

FIG. 6 shows card 601 that is randomly selected (possibly along with other cards) for the Today category. The user may be able for example to scroll through all of the randomly selected cards, or to select option 215 to "shuffle" the cards and reselect cards for the Today category.

Figure 7:
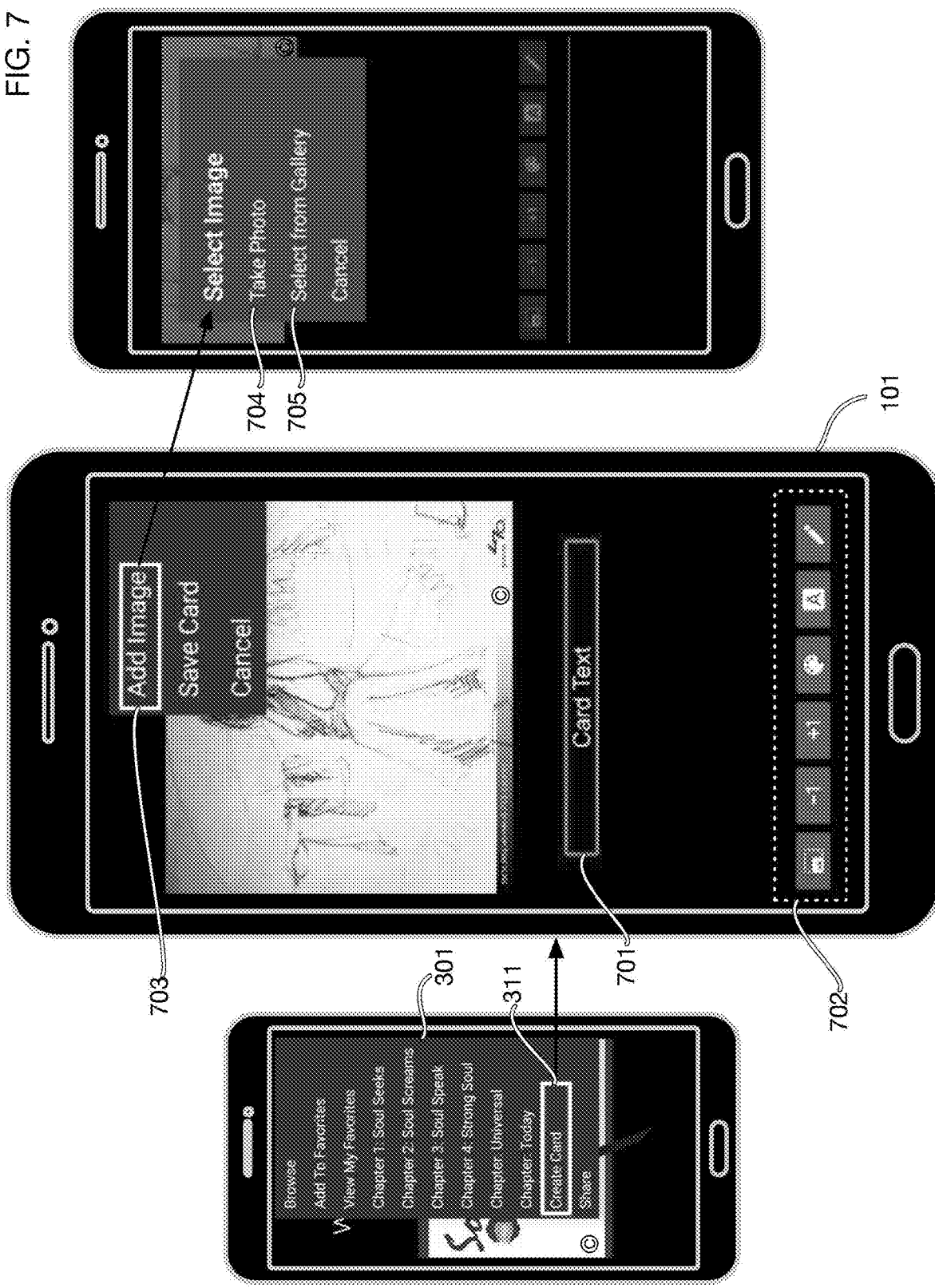
FIG. 7 shows a new card creation interface that the user may use to create a card with text and an image.

FIG. 7 shows a new card creation interface that may be presented when a user selects menu option 311 to create a new card. This interface may include a text entry area 701, text editing controls 702, and an image selection command 703. The user may be able to select an image by taking a photo 704 using the device's camera, or by selecting from a gallery 705 of images stored on or accessible to the device. These options are illustrative; in one or more embodiments the user may be able to create or select any image or drawing or other media using any methods, including for example connecting to cloud-based image storage or search services, or creating a sketch using graphics tools.

Figure 8:
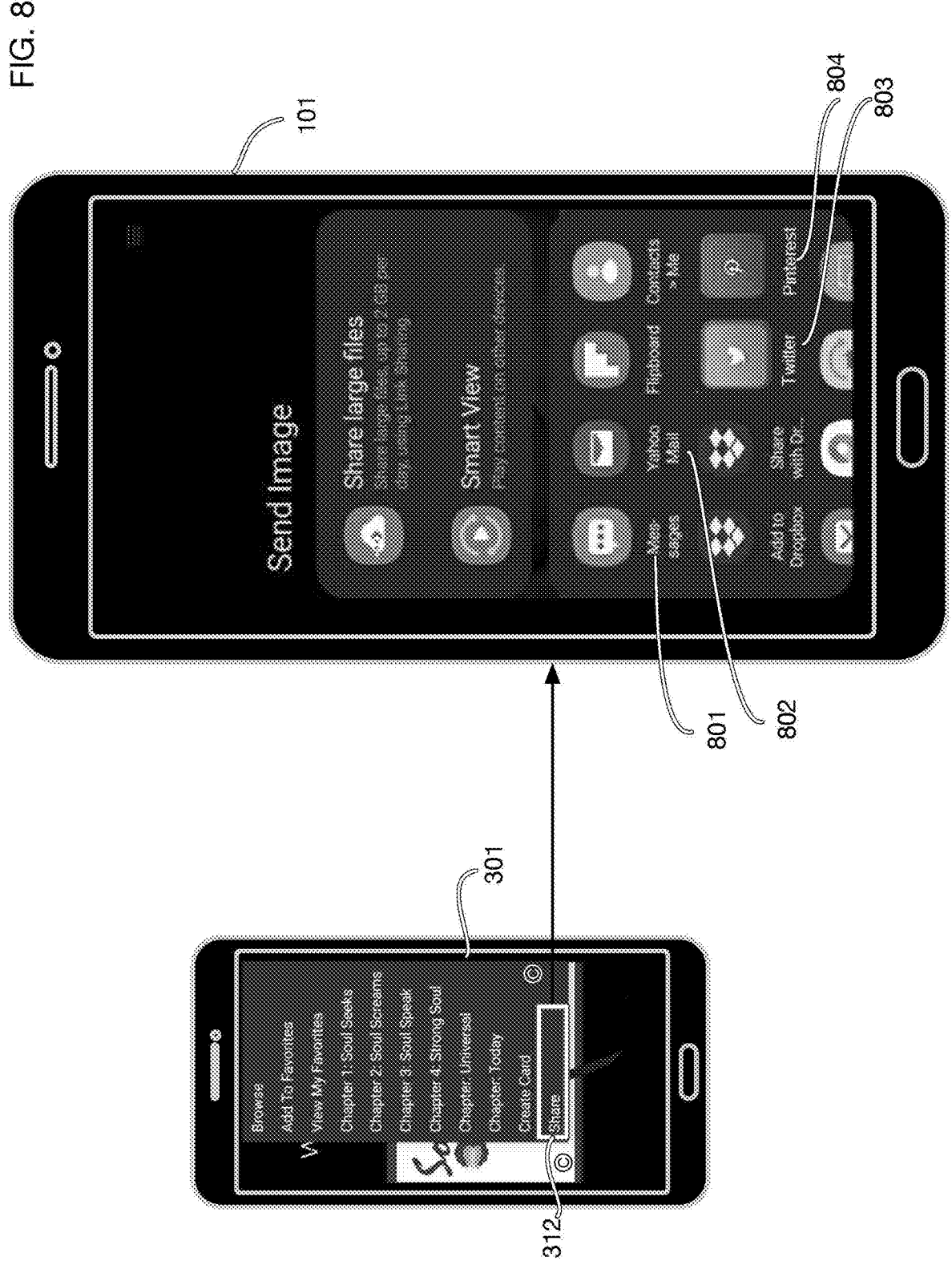
FIG. 8 illustrates card sharing capabilities of an embodiment of the invention.

FIG. 8 shows illustrative options shown when the user selects Sharing menu item 312. Illustrative sharing options 801 and 802 are messaging services (text and email), and options 803 and 804 are social media services. One or more embodiments may allow sharing of cards via any service that may connect via the network interface of the device 101.

While the invention herein disclosed has been described by means of specific embodiments and applications thereof, numerous modifications and variations could be made thereto by those skilled in the art without departing from the scope of the invention set forth in the claims.

What is claimed is:

1. An inspiration quote generation, categorization, and presentation system, comprising:
an application configured to accept input from a user, and to execute on a computing device comprising a processor, a memory, a Screen, a camera, and a network interface; wherein said application is further configured to store a multiplicity of cards in said memory, wherein each card of said multiplicity of cards comprises one or more images; and text; organize said multiplicity of cards into a plurality of categories, wherein each card of said multiplicity of cards is associated with one or more categories of said plurality of categories; and, said plurality of categories comprises a "today" category associated with a plurality of cards selected randomly each day from said multiplicity of cards; a "favorites" category; and a "user-generated" category; themed categories comprising: a "seek" category; a "scream" category; a "speak" category; a "strong" category; each card of said multiplicity of cards is associated with exactly one of said themed categories, or none of said themed categories and with said "user-generated" category, wherein each themed category of said themed categories is associated with one or more of said multiplicity of cards; accept a selected category of said plurality of categories from said user, and display on said screen cards of said multiplicity of cards that are associated with said selected category; accept a selected favorite card of said multiplicity of cards from said user, and associate said selected favorite card with said "favorites" category; accept a card to remove that is associated with said "favorites" category and remove an association between said card to remove and said "favorites" category; present a new card creation interface to said user, wherein said new card creation interface comprises an image selection interface configured to accept input from said user to select a new card image from said camera or from a list of images stored in said memory; and a text editor that accepts new card text from said user; accept input from said user via said new card creation interface and create a new card, said new card comprising said new card image and said new card text; add said new card to said multiplicity of cards; associate said "user-generated" category with said new card; accept a shared card of said multiplicity of cards from said user, and transmit via said network interface said shared card to a sharing service selected by said user from
one or more sharing services, wherein said one or more sharing services comprise one or more of a text message service; an email service; a social media service; accept a shuffle command from said user; when said application receives said shuffle command, replace said plurality of cards associated with said "today" category with a new plurality of cards selected randomly from said multiplicity of cards; accept a browse command from said user; when said application receives said browse command, display on said screen a scrollable tile of thumbnails, wherein each thumbnail of said thumbnails corresponds to a card associated with one or more of said themed categories; and, when said user selects a selected thumbnail of said thumbnails, display said card corresponding to said selected thumbnail.

* * * * *